United States Patent Office 3,143,402
Patented Aug. 4, 1964

3,143,402
PROCESS FOR REMOVAL OF IMPURITIES
FROM BORON HALIDES
George L. Hervert, Downers Grove, and Carl B. Linn, Riverside, Ill., assignors to Universal Oil Products Company, Des Plaines, Ill., a corporation of Delaware
No Drawing. Filed June 19, 1961, Ser. No. 117,781
10 Claims. (Cl. 55—71)

This invention relates to a process for the removal of impurities from boron halides, and more particularly relates to a process for the removal of sulfur compound impurities from boron halides. Still more particularly, this invention relates to a process for separating boron halide from a gaseous mixture comprising boron halide and a sulfur compound impurity.

An object of this invention is to produce purified boron halides, and more particularly to produce purified gaseous boron trifluoride, a desired chemical which is utilized not only as a chemical intermediate but also as a catalyst or as a catalyst component in various hydrocarbon conversion reactions, for example, in the production of alkylated aromatic hydrocarbons.

Previously, it has been suggested that boron trifluoride could be utilized as a catalyst for the alkylation of aromatic hydrocarbons with unsaturated hydrocarbons. For example, Hofmann and Wulff succeeded in replacing aluminum chloride by boron trifluoride for catalysis of condensation reactions of the Friedel-Crafts type (German Patent 513,414, British Patent 307,802, and French Patent 665,812). Aromatic hydrocarbons such as benzene, toluene, tetralin and naphthalene were condensed with ethylene, propylene, isononylene and cyclohexene in the presence of boron trifluoride with the production of the corresponding mono- and polyalkylated aromatic hydrocarbon derivatives. In these processes, rather massive amounts of boron trifluoride were utilized as the catalyst. Similarly, the olefin utilized was pure or substantially pure. More recently, we have found, when utilizing a catalyst comprising a boron trifluoride modified substantially anhydrous inorganic oxide, that the alkylation of aromatic hydrocarbons with olefin-acting compounds is surprisingly easy when substantially pure boron trifluoride is supplied in small quantities along with olefin-acting compound. In some cases, the quantity of boron trifluoride utilized may be appreciably less than 0.8 gram per gram mol of olefin-acting compound and conversion of the olefin-acting compound to alkyl aromatic hydrocarbons still observed.

One embodiment of this invention relates to a process for separating boron halide from a gaseous mixture comprising boron halide and a sulfur compound impurity which comprise contacting said gaseous mixture with a substantially anhydrous liquid hydrocarbon, absorbing at least a portion of said impurity in said hydrocarbon and recovering a purified boron halide.

Another embodiment of this invention relates to a process for separating boron halide from a gaseous mixture comprising boron halide and a sulfur compound impurity which comprise contacting said gaseous mixture with a substantially anhydrous liquid aromatic hydrocarbon, absorbing at least a portion of said impurity in said aromatic hydrocarbon, and recovering a purified boron halide.

Still another embodiment of this invention relates to a process for separating boron trifluoride from a gaseous mixture comprising boron trifluoride and a sulfur compound impurity which comprise contacting said gaseous mixture with a substantially anhydrous liquid aromatic hydrocarbon, absorbing at least a portion of said impurity in said aromatic hydrocarbon, and recovering a purified gaseous boron trifluoride.

A still further embodiment of this invention relates to a process for separating boron halide from a gaseous mixture comprising boron halide and an oxide of sulfur impurity which comprise contacting said gaseous mixture with a substantially anhydrous liquid aromatic hydrocarbon, absorbing at least a portion of said impurity in said aromatic hydrocarbon and recovering a purified boron halide.

An additional embodiment of this invention relates to a process for separating boron trifluoride from a gaseous mixture comprising boron trifluoride and an oxide of sulfur, contacting said gaseous mixture in an absorption zone at absorption conditions including a temperature of from about 0° to about 300° C. and a pressure of from about atmospheric to about 200 atmospheres, said conditions being correlated to maintain a liquid phase, utilizing a substantially anhydrous liquid aromatic hydrocarbon such as benzene, absorbing at least a portion of said oxide of sulfur impurity in said aromatic hydrocarbon, and recovering purified gaseous boron trifluoride.

Other objects and embodiments referring to alternative boron halides and to alternative sulfur compound impurities will be found in the following detailed description of the invention.

As set forth hereinabove, the present invention relates to a process for removing impurities from boron halides, and more particularly to produce purified gaseous boron trifluoride. The purity of boron trifluoride, particularly boron trifluoride, available from commercial sources is usually over 99.5% but always less than 100%. We have found, when using such boron trihalides, i.e. boron trifluoride, that the effect of the impurities is detrimental in the production of alkylated aromatic hydrocarbons. The major impurities found in this commercially available boron trifluoride are sulfur dioxide, silicon tetrafluoride, sulfate, and air. The term "sulfate" herein represents sulfuric acid and/or iron sulfate. Although the boron trifluoride is purified during its manufacture, the hereinabove mentioned impurities originate in the raw materials used to generate boron trifluoride or are inherent in its method of manufacture and persist in the final product.

We have found, when utilizing this commercially available boron trifluoride, that the sulfur compound impurities are the most injurious in the production of alkylated aromatic hydrocarbons. In accordance with the process of the present invention, the removal of these sulfur compound impurities comprises contacting a gaseous mixture comprising boron halide and a sulfur compound impurity with a substantially anhydrous liquid hydrocarbon and absorbing at least a portion of the sulfur compound impurity in the hydrocarbon and recovering purified boron halide. These sulfur compound impurities include the oxides of sulfur such as sulfur monoxide, sulfur dioxide, sulfur sesquioxide, sulfur trioxide, etc. Other sulfur compound impurities include the oxyacids of sulfur such as sulfoxylic acid, sulfurous acid, hydrosulfurous acid, thiosulfurous acid, sulfuric acid, etc., and their derivatives known as the oxyacid salts of sulfur such as those containing as central atoms especially the metals sodium, potassium, manganese, iron, cobalt, nickel, copper, zinc, ruthenium, rhodium, palladium, silver, cadmium, osmium, iridium, platinum, gold, mercury, beryllium, magnesium, etc. In addition to the hereinabove mentioned sulfur compound impurities, the alkyl derivatives of hydrogen sulfide sometimes are encountered and are present as impurities as aforesaid. These comprise the mono-alkyl derivatives of hydrogen sulfide known as the thio-alcohols or mercaptans and are represented by $C_nH_{2n+1}SH$, where $n$ may be from about 1 to 20 or more, including such compounds as methylmercaptan, ethyl mercaptan, n-propyl mercaptan, isopropyl mercaptan, n-butyl mercaptan, isobutyl mercaptan, sec-butyl mercaptan, t-butyl mercaptan, n-amyl mercaptan, isoamyl mercaptan, t-amyl mercaptan, etc. The di-alkyl derivatives of hydrogen sulfide known as the thio-ethers or sulfides are also encountered and may be represented by $C_nH_{2n+1}SC_mH_{2m+1}$ where $n$ and/or $m$ may be from about 1 to 20 or more, including such as dimethyl thioether, methyl ethyl thioether, diethyl thioether, di-n-propyl thioether, diisopropyl thioether, methyl n-butyl thioether, ethyl n-butyl thioether, di-n-butyl thioether, di-n-amyl thioether, diisoamyl thioether, and the like. It will be appreciated by those skilled in the art that the foregoing list of compounds has by no means exhausted the total number of sulfur compound impurities that may be present in commercially available boron trifluoride. Such enumerations are intended to be exemplary only and not limiting the broad scope of the present invention.

Many suitable hydrocarbons such as the paraffins, cycloparaffins, aromatics, etc. are utilizable as absorption media in the process of this invention. Suitable paraffins are normal butane, isobutane, normal pentane, isopentane, neopentane, normal hexane, etc. Suitable cyclo paraffins are cyclobutane, cyclopentane, cyclohexane, cycloheptane, cyclooctane, etc. Suitable aromatic hydrocarbons include benzene, toluene, orthoxylene, meta-xylene, para-xylene, ethylbenzene, orthoethyltoluene, meta-ethyltoluene, para-ethyltoluene, 1,2,3-trimethylbenzene, 1,2,4-trimethylbenzene, 1,3,5-trimethylbenzene, or mesitylene, normal propylbenzene, isopropylbenzene, etc. Preferred hydrocarbons are monocyclic aromatic hydrocarbons, that is, benzene hydrocarbons. Higher molecular weight alkyl aromatic hydrocarbons are also suitable as absorption media and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable absorption media would include those aromatic hydrocarbons which at specified absorption conditions, depending on melting point of the aromatic chosen, would be in liquid form, for example, aromatic hydrocarbons with two or more aryl groups such as diphenyl, diphenylmethane, triphenyl, triphenylmethane, fluorene, stilbene, etc. Examples of other aromatic hydrocarbons within the scope of this invention as absorption media containing condensed benzene rings, at specified absorption conditions so that they also are in liquid form include naphthalene, alpha-methyl naphthalene, beta-methyl naphthalene, anthracene, phenanthrene, naphthacene, rubrene, etc. Of the above-mentioned aromatic hydrocarbons for use as absorption media in the process of this invention, the benzene hydrocarbons are preferred, and of the preferred benzene hydrocarbon, benzene itself is particularly preferred.

In accordance with the process of the present invention, the removal of sulfur oxide impurities is effected in the presence of a substantially anhydrous liquid hydrocarbon at a temperature of from about 0° C. or lower to about 300° C. or higher, and preferably from about 20° to about 230° C., although the exact temperature needed will depend upon the particular hydrocarbon employed. The absorbing or scrubbing process is usually carried out at a pressure of from about substantially atmospheric to about 200 atmospheres. The pressure utilized is usually selected to maintain the particularly employed hydrocarbon in substantially liquid phase.

In removing sulfur compound impurties to effect purified boron halide thereof with the type of absorbing or scrubbing media herein described, either batch or continuous operations may be employed. The actual operation of the process may be either concurrent or countercurrent. The details of processes of this general character are familiar to those skilled in the art and any necessary additions or modifications of the above general procedures will be more or less obvious and can be made without departing from the broad scope of this invention.

The process of the present invention is illustrated by the following examples which are introduced for the purpose of illustration and with no intention of unduly limiting the generally broad scope of the invention.

EXAMPLE I

This example illustrates the effectiveness of the process of the present invention utilizing a substantially anhydrous liquid aromatic hydrocarbon to remove sulfur dioxide from a gaseous mixture of boron trifluoride and sulfur dioxide when the boron trifluoride is subsequently utilized as a catalyst for the alkylation of an aromatic hydrocarbon with an olefin-acting compound. The experiments were conducted in a once-through bench scale processing unit consisting of liquid and gas charge pumps, reaction tube, high pressure gas separator, pressure controller, and liquid and gas collection systems. The reactor effluent was collected in the high pressure separator at reactor pressure. Boron trifluoride was metered from a charger under pressure through an absorber under pressure into the reaction zone.

The reaction tube was charged with a catalyst prepared in the form of $1/16''$ diameter spheres. The catalyst had the following physical properties: surface area, 146 square meters per gram; pore volume, 0.591 cubic centimeter per gram; pore diameter, 162 A.; and apparent bulk density, 0.525 gram per milliliter. Sixty milliliters (31.5 grams) of the catalyst was charged to the reactor. Boron trifluoride was added to the reactants as a 3% mixture in dry nitrogen.

The benzene utilized in the following experiments was dried and stored over calcium chloride and in the plant by passing it through a dryer containing high surface sodium. The composition of the dilute olefin feed for the first 72 hours of processing was as follows: nitrogen, 90.7 mol percent; ethylene, 9.3 mol percent. The composition of the dilute olefin feed for the succeeding 192 hours on stream was: nitrogen, 89.5 mol percent; ethylene, 10.5 mol percent. The reactor containing the catalyst was then pressured with the dilute olefin gas to 500 p.s.i.g. and thereafter the benzene pump was started, pressure was controlled at 500 p.s.i.g., and the input of boron trifluoride was started. Plant furnace temperature was raised to the operating temperature of 150° C. Initial boron trifluoride input of 0.105 gram per gram mol of ethylene passed through the absorber containing substantially anhydrous benzene at room temperature and operating pressure of 500 p.s.i.g., thus giving an $SO_2$ concentration of less than 0.07 wt. percent in the boron trifluoride. After 73 hours of operation at 100% ethylene conversion, the $SO_2$ concentration in the boron trifluoride input increased from less than 0.07 to about 0.18 wt. percent by bypassing the absorber. Thereafter, during a period from 144 to 192 hours on stream, the $SO_2$ content of the boron trifluoride was increased to 41.8% with the ethylene conversion decreasing to 71%. Thereafter, to the end of the test, at 264 hours on stream, the original activity of the catalyst was restored by bubbling the $BF_3$ through the absorber containing benzene and reducing the $SO_2$ content to less than 0.07 wt. percent $SO_2$. The operating conditions utilized and the results obtained in the 264 hour run are summarized in the following Table I:

*Table I*

EFFECT OF $SO_2$ CONTENT OF $BF_3$ ON ETHYLATION ACTIVITY

| Tests | 1 | 2 | 3 | 4 |
|---|---|---|---|---|
| Accumulated hours | 1–72 | 72–143 | 143–192 | 192–264 |
| Ethylene feed, mol percent: | | | | |
| Ethylene | 9.3 | 10.5 | 10.5 | 10.5 |
| Nitrogen | 90.7 | 89.5 | 89.5 | 89.5 |
| Solid Catalyst Component | $BF_3$—modified gamma—$Al_2O_3$ | | | |
| $BF_3$ Input, gms./gr. mol $C_2H_4$ | 0.105 | 0.100 | 0.140 | 0.105 |
| Benzene/$C_2H_4$, mol ratio | 7.3 | 7.3 | 7.3 | 7.3 |
| Temperature, °C | 150 | 150 | 150 | 150 |
| Pressure, p.s.i.g | 511 | 505 | 501 | 500 |
| LHSV, benzene | 1.48 | 1.47 | 1.49 | 1.44 |
| $SO_2$ content of $BF_3$ input, wt. percent | <0.07 | 0.18 | 41.8 | <0.07 |
| Percent Ethylene conversion to alkylated aromatics (ethylbenzene, diethylbenzenes, triethylbenzenes +) | 100 | 100 | 100→71 | 71→100 |

From the above table, it is observed that at Test 1 conditions, at a boron trifluoride input of 0.105 gram per gram-mol of ethylene through the absorber containing benzene, the $SO_2$ concentration was lowered to less than 0.07 wt. percent in the boron trifluoride. After 73 hours of operation with this $SO_2$ concentration and at 100% ethylene conversion to ethylbenzene, diethylbenzene, and triethylbenzenes, the absorber was removed from service by bypassing it, and the $SO_2$ concentration in the boron trifluoride input increased from less than 0.07 to about 0.18 wt. percent. In going from Test I to Test 2, the $SO_2$ concentration of 0.18 wt. percent did not have a noticeable depressing effect on the catalyst activity. Ethylene conversion remained at 100%. Then, in going from Test 2 to Test 3, with the absorber still bypassed, the $SO_2$ concentration in the boron trifluoride was increased to 41.8 wt. percent. The ethylation of benzene decreased from 100 to 71% after 49 hours of operation with the $SO_2$ enriched boron trifluoride. In going from Test 3 to Test 4, the absorber containing benzene was returned to service and the $SO_2$ concentration in the boron trifluoride decreased to less than 0.07 wt. percent. The ethylation activity of the catalyst was completely restored within 65 hours by the use of this purified boron trifluoride inasmuch as the ethylation depressing effect of $SO_2$ was found to be transient in nature. The restored ethylation activity of the catalyst after being depressed by $SO_2$ from a standpoint of selectivity was equivalent to the original activity inasmuch as conversion of ethylene to ethylbenzene and diethylbenzene was similar in both Test 1 and Test 4 test periods.

The recovered catalyst was free-flowing and appeared sludge-free. Most of the catalyst spheres were of a light tan color; however, a very small number were white or red in color. Approximately 10% of the total sulfur input of 0.4142 gram was found in the catalyst at the end of the run.

The above results show that the ethylation activity of the $BF_3$-modified gamma-alumina plus an input of $BF_3$ is dependent upon the process of this invention in substantially removing sulfur compound impurities from the added $BF_3$ input.

EXAMPLE II

This example illustrates the effectiveness of the process of the present invention utilizing a substantially anhydrous liquid hydrocarbon to remove sulfur dioxide from a gaseous mixture of boron trifluoride and sulfur dioxide. The same once-through bench scale processing unit described in Example I is also utilized for the experiment described in this example. Boron trifluoride is added to the reactants as a 3% mixture in dry nitrogen.

The reaction tube is charged with 60 milliliters (31.5 grams) of the same catalyst described in Example I. This catalyst has the same physical properties as set forth hereinabove. The benzene utilized in the following experiments is dried and stored over calcium chloride and then in the plant by passing it through a drier containing high surface sodium. The composition of the dilute olefin feed for the entire run comprises 89.5 mol percent nitrogen and 10.5 mol percent ethylene. The reactor containing the catalyst is then pressured with the dilute olefin gas to 500 p.s.i.g., and thereafter the benzene pump is started, pressure is controlled at 500 p.s.i.g., and the input of boron trifluoride is started. Plant temperatures are raised to the operating temperature of 150° C. Initial boron trifluoride input of 0.105 gram per gram mol of ethylene is passed through the absorber containing substantially anhydrous normal heptane at room temperature and operating pressure of 500 p.s.i.g. Operation at 100% ethylene conversion to ethylbenzene, diethylbenzene, and triethylbenzene is achieved. The normal heptane filled scrubber is removed from service and bypassed and with an $SO_2$ enriched boron trifluoride input, ethylene conversion decreased rapidly. Thereafter, to the end of the test, the original activity of the catalyst is substantially restored by returning the normal heptane filled absorber to service and passing boron trifluoride through it.

EXAMPLE III

This example illustrates the effectiveness of the process of the present invention utilizing a substantially anhydrous liquid aromatic hydrocarbon to remove methyl mercaptan, an alkyl derivative of hydrogen sulfide, from the gaseous mixture of boron trichloride and methyl mercaptan. The experiment is carried out whereby a gaseous stream of methyl mercaptan enriched boron trichloride is passed through an absorber containing toluene at room temperature and about 500 p.s.i.g. pressure. The gaseous boron trichloride recovered is determined to be substantially free of methyl mercaptan.

We claim as our invention:

1. A process for separating boron trifluoride from a gaseous mixture comprising boron trifluoride and a sulfur compound impurity which comprises contacting said gaseous mixture with a substantially anhydrous liquid hydrocarbon, absorbing at least a portion of said impurity in said hydrocarbon, and recovering a purified boron trifluoride.

2. A process for separating boron trifluoride from a gaseous mixture comprising boron trifluoride and a sulfur compound impurity which comprises contacting said gaseous mixture with a substantially anhydrous liquid aromatic hydrocarbon, absorbing at least a portion of said impurity in said aromatic hydrocarbon, and recovering a purified boron trifluoride.

3. The process of claim 2 further characterized in that said sulfur compound impurity is an oxide of sulfur.

4. The process of claim 2 further characterized in that said sulfur compound impurity is an oxyacid of sulfur.

5. The process of claim 2 further characterized in that said sulfur compound impurity is an oxyacid salt of sulfur.

6. The process of claim 2 further characterized in that said sulfur compound impurity is an alkyl derivative of hydrogen sulfide.

7. A process for separating boron trifluoride from a gaseous mixture comprising boron trifluoride and an oxide of sulfur, which comprises contacting said gaseous mixture at absorption conditions with a substantially anhydrous liquid benzene hydrocarbon, absorbing at least a portion of said oxide of sulfur in said hydrocarbon, and recovering purified gaseous boron trifluoride.

8. The process of claim 7 further characterized in that said hydrocarbon is benzene.

9. The process of claim 7 further characterized in that said absorption conditions include a temperature of from about 0° to about 300° C. and a pressure of from about atmospheric to about 200 atmospheres, said conditions being correlated to maintain a liquid phase.

10. A process for the treatment of a gaseous mixture of boron trifluoride and sulfur dioxide which comprises contacting the mixture with substantially anhydrous liquid benzene at conditions to absorb at least a portion of the sulfur dioxide in the benzene, and recovering purified gaseous boron trifluoride.

References Cited in the file of this patent

UNITED STATES PATENTS

| | | |
|---|---|---|
| 2,264,878 | Hatch | Dec. 2, 1941 |
| 2,301,779 | Herold et al. | Nov. 10, 1942 |
| 2,920,942 | Bratt et al. | Jan. 12, 1960 |
| 2,992,076 | Thompson et al. | July 11, 1961 |